United States Patent
Bremnes

(10) Patent No.: US 7,285,726 B2
(45) Date of Patent: Oct. 23, 2007

(54) SUBSEA POWER CABLE

(75) Inventor: Jarle Jansen Bremnes, Fredrikstad (NO)

(73) Assignee: Nexans, Paris (FR)

( * ) Notice: Subject to any disclaimer, the term of this patent is extended or adjusted under 35 U.S.C. 154(b) by 0 days.

(21) Appl. No.: 11/502,635

(22) Filed: Aug. 10, 2006

(65) Prior Publication Data

US 2007/0044992 A1    Mar. 1, 2007

(30) Foreign Application Priority Data

Aug. 25, 2005  (NO) ................................. 20053963

(51) Int. Cl.
*H01B 7/18*    (2006.01)

(52) U.S. Cl. ...................... 174/102 R; 174/102 SC; 174/102 C; 174/103; 174/105 R; 174/105 SC

(58) Field of Classification Search ................. 174/36, 174/110 R, 110 SC, 120 R, 120 SC, 102 R, 174/102 SC, 106 R, 108
See application file for complete search history.

(56) References Cited

U.S. PATENT DOCUMENTS

| | | | |
|---|---|---|---|
| 3,980,808 A * | 9/1976 | Kikuchi et al. | 174/110 SR |
| 4,317,000 A * | 2/1982 | Ferer | 174/70 R |
| 4,360,704 A * | 11/1982 | Madry | 174/36 |
| 4,826,278 A * | 5/1989 | Gartside et al. | 385/105 |
| 4,867,527 A * | 9/1989 | Dotti et al. | 385/101 |
| 4,986,372 A * | 1/1991 | Ganssle | 174/106 SC |
| 5,042,903 A * | 8/1991 | Jakubowski | 385/101 |
| 5,043,538 A * | 8/1991 | Hughey et al. | 174/107 |
| 5,285,513 A * | 2/1994 | Kaufman et al. | 385/109 |
| 5,300,733 A * | 4/1994 | Uematsu | 174/106 SC |
| 6,242,692 B1 * | 6/2001 | King | 174/36 |
| 6,417,457 B1 * | 7/2002 | Aasbo et al. | 174/120 R |
| 7,085,457 B2 * | 8/2006 | Lancaster et al. | 385/101 |
| 2002/0028070 A1 | 3/2002 | Holen | 392/478 |

FOREIGN PATENT DOCUMENTS

| EP | 0887808 | 2/1998 |
|---|---|---|
| JP | 06-325625 A * | 11/1994 |

* cited by examiner

*Primary Examiner*—William H. Mayo, III
(74) *Attorney, Agent, or Firm*—Sofer & Haroun, LLP

(57) ABSTRACT

A subsea power cable includes a conductor encompassed by a layer of high voltage insulation material including inner and outer semiconducting layers. The insulated conductor is encompassed by a number of armouring elements each consisting of fibers enclosed within a semiconductive layer.

9 Claims, 2 Drawing Sheets

SUBSEA POWER CABLE

RELATED APPLICATION

This application is related to and claims the benefit of priority from Norwegian Patent Application No. 2005 3693, filed on Aug. 25, 2005, the entirety of which is incorporated herein by reference.

DESCRIPTION

1. Field of the Invention

The present invention relates to an electrical subsea cable with an electrical conductor, an insulation and a sheath.

2. Background

For the energy supply of electrical devices on the seafloor subsea cables are known which contain one or several conductors with an insulation and an outer sheath. In cables for the medium high voltage range, the insulation comprises in an inner screen adjacent to the surface of the conductor and a second screen on the outer surface of the insulation. The cable is generally armoured to be protected from damage which may be caused by outer impact forces, e.g. by fishing gears or falling objects.

To prevent the blocking of oil pipelines by freezing oil components especially when the flow is stopped electrical heating systems are utilized.

GB 2 341 442 A describes an example of a heating system which can be used for pipelines on the sea floor. In this system, the metallic tube of the pipeline is electrically and thermally insulated and connected to a power supply which feeds a current through the metallic tube, whereby an efficient heating is achieved with alternating current.

U.S. Pat. No. 6,417,457 B1 discloses an electrical subsea cable with an electrical conductor, an insulation and a sheath, wherein the sheath comprises two polymer layers, wherein the outer layer of the sheath has a mechanical hardness that is higher than a hardness of the insulation and wherein a hardness of the inner layer of the sheath is lower than the hardness of the insulation. A metallic screen underneath the sheath which comprises drain conductors e.g. copper tapes, can be used for grounding to avoid capacitive charging of a semi conducting screen surrounding the insulation. To improve the resistance against axial forces, the sheath comprises fibers made from dielectric material, for example aramid. The fibres are disposed in or adjacent to the hard layer of the sheath to ensure an efficient transfer of forces.

A subsea cable for the connection of the pipeline and the power supply may be squeezed during installation between the pipeline and hard objects. As the pipeline expands and contracts during operation, the cable is generally subject to stretching and sliding forces against the seabed. These problems are aggravated, if the pipeline spans valleys between reefs or boulders on the seabed.

A sufficient protection can be achieved with a steel armouring if the cable carries both the feeding and the return current. The direct electric heating system, however, requires only a single conductor because the metallic tube of the pipeline is used as conductor. In this case, an alternating current causes excessive electrical losses if a metal armour is applied to the cable.

This cable does not fit the very special requirements of a direct electric so called piggyback cable, which is arranged alongside a subsea oil or gas pipeline. The metallic screen accumulates charging current to its earthed end. One major disadvantage of this solution is that the metallic screen adopts a voltage to earth (camel hump shape). The screen would "steal" the desired current from the pipeline.

OBJECTS AND SUMMARY

It is therefore an object of the present invention to obviate these disadvantages and to develop an electrical subsea cable with a metal free sheath which protects the cable from outer forces.

According to the invention the sheath is made of semiconducting polymeric material with a number of armouring elements of dielectric material, which are embedded in the sheath.

The main advantage of the subsea cable according to the invention is, that the semiconducting sheath will conduct the cable's radially orientated capacitive charging current out to the surrounding sea water, which then finds its way "home" via the electrically conductive sea water.

The non-metallic armouring elements improve the axial strength of the cable without hindering the radially orientated capacitive charging current to be conducted out to the sheath.

A further advantage of the subsea cable according to the invention is that due to the armouring elements it can be installed in great depths.

The armouring elements are applied to the outer semiconducting layer and finally the outer sheath is extruded over the amouring layer.

In an advantageous embodiment the armouring elements consist of carbon fibers, ployaramid fibers or fibers of highly oriented polyethylene. These bundles of such fibers are encompassed by a sheath of a polymeric material which preferably is semiconductive.

Alternatively the armouring elements are threads of fiber reinforced plastic.

The armouring elements may be round or may have a flat cross-section.

The proposed cable is suitable for use in an electrical heating system for an insulated metallic tube, especially a pipeline laid in great depths, wherein a current is fed through the wall of the tube. The cable connects the tube to a power supply which normally is an armoured riser cable from the seafloor to the surface where it is connected to a feeding unit. The system is preferably an open system wherein a part of the current flows through the seawater.

BRIEF DESCRIPTION OF THE DRAWINGS

The foregoing and other objects, features and advantages of the present invention will become more apparent in the following detailed description of preferred embodiments as illustrated in the accompanying drawings.

DETAILED DESCRIPTION

Figure 1:
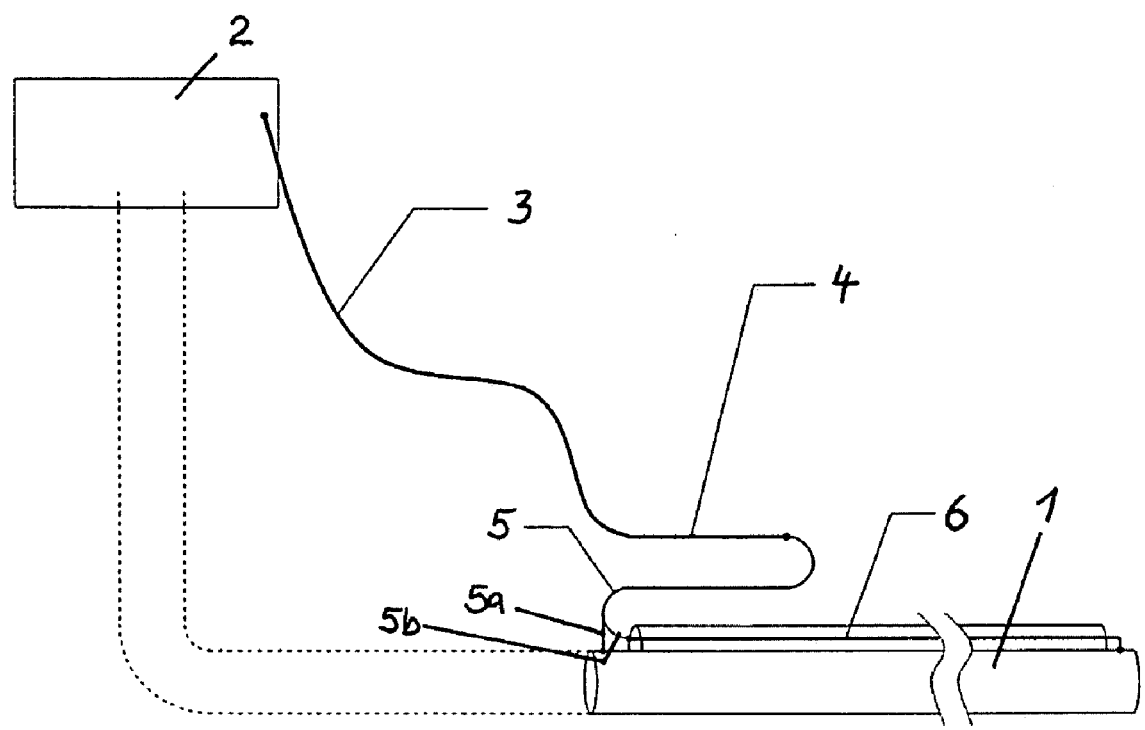
FIG. 1 shows a heating system with an electrical cable according to the invention.

In FIG. 1, a pipeline heating system which comprises a cable according to the present invention is illustrated. An insulated metal tube 1 (i.e. the pipeline) connects a template (not shown) on the seafloor with a processing unit (not shown) installed on a platform 2. The metal tube 1 has an outer thermal insulation ensuring that crude oil coming from the template has a sufficiently low viscosity until it reaches the platform 2. If the oil flow is stopped, formation of hydrate plugs and wax deposits occur which can block the pipeline when oil transportation is to be resumed again.

To avoid this problem the tube 1 can be heated. One or several sections of the tube 1 are connected to a power supply unit (not shown) installed on the platform 2 with a riser cable 3 containing one or more conductor pairs with an insulated feeder and return conductor. The riser cable 3 is protected by an armouring and an outer sheathing.

At the lower end of the riser cable 3 there is a static section 4 of the riser cable 3, to the end of which an armoured feeder cable 5 with two conductors 5a, 5b is connected. The conductor 5a is connected to the metal tube 1 and the conductor 5b is connected to the conductor of a piggyback cable 6. The conductor of the piggyback cable 6 is connected to the far end of the metal tube 1.

Figure 2:
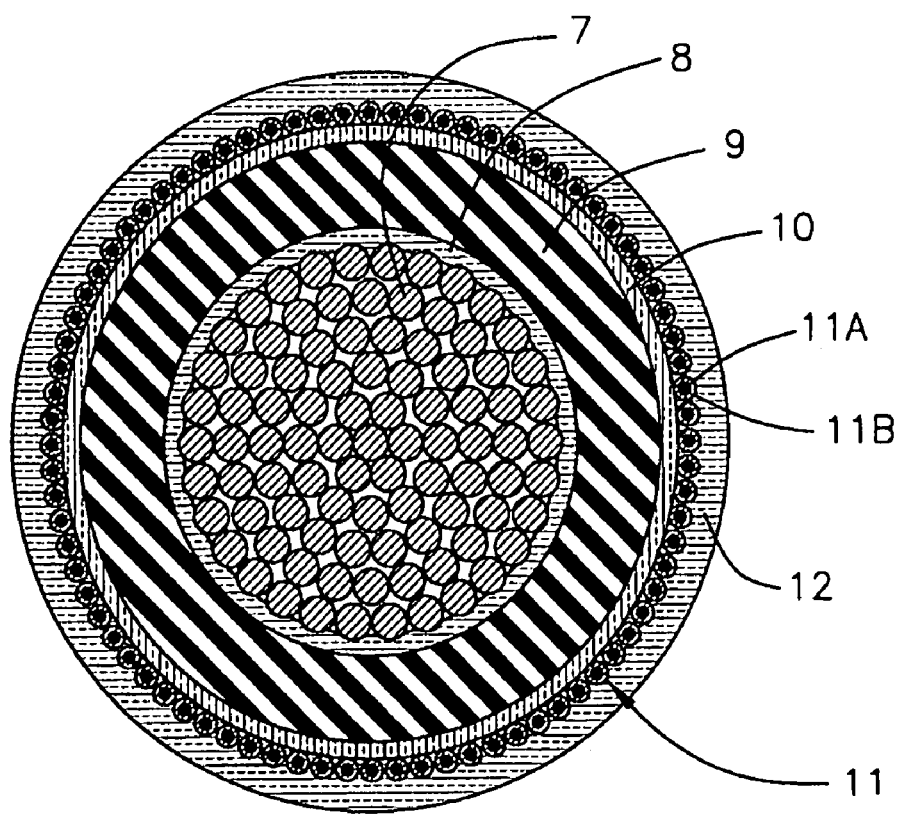
FIG. 2 shows a cross-section of a cable according to the invention.

The piggyback cable 6 has a cross-section as shown in FIG. 2.

The conductor 7 consists of stranded copper wires. To prevent longitudinal water penetration and facilitate repair, gaps in the conductor 7 are filled with a hydrophobic water-blocking compound.

The conductor 7 is surrounded by an inner screen 8 of semiconducting cross-linked polyethylene, an insulation 9 of cross-linked polyethylene and an outer screen 10 consisting of semiconducting cross-linked polyethylene. The inner screen 8, the insulation 9 and the outer screen 10 are applied to the conductor 7 in a single, triple extrusion process and cross-linked by applying heat to the layers 8, 9 and 10.

A layer of armouring elements 11 is wound to the outer screen 10. Each armouring element 11 consists of a bundle 11a of high-strength fibers such as polyaramide fibers, carbon fibers etc. Preferred are polyethylene resin fibers developed by DSM and sold in the market under the registered trade mark Dyneema. Dyneema is a highly oriented polyethylene fiber, which is 40% stronger than competing aramid fibers.

Each bundle 11a is coated with a layer 11b of polymeric material which preferably is semiconducting.

Figures 3A, 3B:
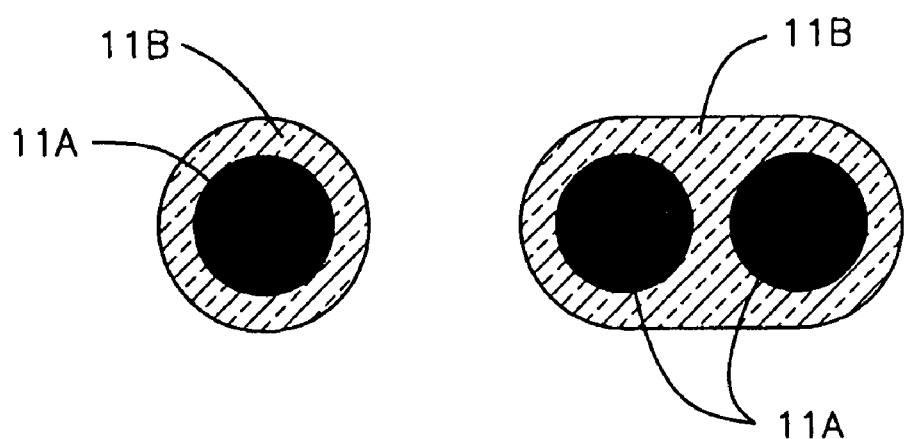
FIGS. 3a-3b show cross-sections of different armouring elements.

The cross-section of the armouring elements 11 may be circular (FIG. 3a) or flat (FIG. 3b). The armouring elements 11 give high strength to the subsea cable 6 so that it can be installed in great depths. A semiconducting sheath 12 is applied to the layer of armouring elements 11 by way of extrusion. The semiconducting sheath 12 allows that radial charging current may flow through the sheath 12 into the seawater.

The invention claimed is:

1. Subsea power cable comprising:
   a conductor encompassed by a layer of high voltage insulation material including inner and outer semiconducting layers the insulated conductor being encompassed by a number of armouring elements serving to improve axial strength of the cable and to protect it from damage caused by outer impact forces, wherein the armouring elements each including fibers enclosed within a semiconductive layer, and the outermost layer of said cable being semiconductive.

2. Subsea cable according to claim 1, wherein the armouring elements are carbon fibers.

3. Subsea cable according to claim 1, wherein the armouring elements are polyaramide fibers.

4. Subsea cable according to claim 1, wherein the armouring elements are fiber reinforced plastic.

5. Subsea cable according to claim 1, wherein the armouring elements are oriented polyethylene resin fibers.

6. Subsea cable according to claim 1, wherein each armouring element is a bundle of high strength fibers which are encompassed by a sheath of a polymeric material.

7. Subsea cable according to claim 6, wherein at least two bundles of fibers are encompassed by a common sheath of polymeric material wherein the sheath has a nearly flat or nearly oval cross-section.

8. Subsea cable according to claim 6, wherein the sheath is a semiconductive polymeric material.

9. A heating system for crude oil pipelines comprising:
   a thermally insulated pipeline in which at least a portion of the pipeline acts as a heating element, the heating element having connections to a subsea cable at opposite ends of the length of the pipeline defining the heating element, wherein the subsea cable is a subsea cable according to claim 1.

* * * * *